United States Patent [19]
Ezawa

[11] Patent Number: 5,398,090
[45] Date of Patent: Mar. 14, 1995

[54] CAMERA WINDING-UP APPARATUS
[75] Inventor: Akira Ezawa, Tokyo, Japan
[73] Assignee: Nikon Corporation, Tokyo, Japan
[21] Appl. No.: 268,724
[22] Filed: Jun. 30, 1994

Related U.S. Application Data

[63] Continuation of Ser. No. 135,422, Oct. 12, 1993, abandoned, which is a continuation of Ser. No. 757,026, Sep. 9, 1991, abandoned.

[30] Foreign Application Priority Data

Sep. 10, 1990 [JP] Japan .................................. 2-239431

[51] Int. Cl.6 .............................................. G03B 1/18
[52] U.S. Cl. ................................................ 354/173.1
[58] Field of Search ......................... 354/173.1, 173.11

[56] References Cited

U.S. PATENT DOCUMENTS 4,832,275  5/1989  Robertson ........................... 242/71.1
4,855,773  8/1989  Harvey .............................. 354/173.1
4,939,531  7/1990  Sawamura et al. ............... 354/173.1
4,987,431  1/1991  Harvey .............................. 354/173.1
5,136,314  8/1992  Kazami et al. .................... 354/173.1

Primary Examiner—David M. Gray
Attorney, Agent, or Firm—Shapiro and Shapiro

[57] ABSTRACT

A camera film wind-up apparatus for winding up a film wound around a cartridge spool, the film being housed in a cartridge having the cartridge spool, comprises a first driving apparatus for rotatably driving the cartridge spool, a wind-up spool around which a film extended from the cartridge is wound, a second driving apparatus for rotatably driving the wind-up spool, and a control apparatus. The control apparatus controls the first driving apparatus so as to control the amount of rotation of the cartridge spool on the basis of the amount of the rotation of the wind-up spool during the winding-up of the film, thereby preventing the film from being tightly wound around the cartridge spool.

10 Claims, 10 Drawing Sheets

CAMERA WINDING-UP APPARATUS

This is a continuation of application Ser. No. 08/135,422, filed Oct. 12, 1993, which is a continuation of application Ser. No. 07/757,026, filed Sep. 9, 1991, both now abandoned.

BACKGROUND OF THE INVENTION

1. Field of the Invention

The present invention relates to a camera winding-up apparatus which uses a cartridge in which a film is housed in such a manner that it is wound around a cartridge spool and which winds up this film by a wind-up spool.

2. Related Background Art

A system having a cartridge different from a currently used 135-type film cartridge is disclosed in U.S. Pat. No. 4,832,275. In this film cartridge, at first the front end of a film is not exposed to outside of the cartridge. When a cartridge spool is rotated in the film feeding direction after it is loaded into a camera, the film is thrust out of the cartridge.

The inventor of the present invention has previously proposed a camera winding/rewinding apparatus, in which the above kind of film cartridge is loaded, in U.S. Ser. No. 599,830 (filed on Oct. 19, 1990).

FIG. 9 is a perspective view schematically showing this above apparatus.

In this apparatus, a spool 3a of a cartridge 3 is driven via a driving mechanism 2 and a wind-up spool 5 of a camera is driven via a driving mechanism 4 by one film feeding motor 1. The ratio of the gear of the driving mechanism 2 to that of driving mechanism 4 is set in such a manner that the feeding speed of a film 6 is slower than the peripheral speed of the wind-up spool 5. The film 6 is fed at a speed slower than the peripheral speed of the wind-up spool 5 during the initial winding-up, i.e., until the film 6 is wound around the wind-up spool 5 after it is fed from the cartridge 3. As a result, the film 6 is reliably wound around the wind-up spool 5. Since, even after the front end of the film 6 is wound around the wind-up spool 5, both spools 3a and 5 are driven at the same gear ratio, the film 6 is pulled out of the cartridge 3 by the wind-up spool 5, instead of it being thrust out of the cartridge 3 by the cartridge spool 3a.

In this film cartridge 3, the film 6 expands outwardly inside the cartridge 3 in response to the rotation of the cartridge spool 3a during the initial film feeding, and then comes out of the cartridge 3. That is, the film 6 is in a loosely wound state relative to the cartridge spool 3a. Even after the front end of the film 6 is wound around the wind-up spool 5 during the initial winding-up, the film 6 inside the cartridge 3 is in this loose state for some time. Each time one film frame is fed after photo-taking, the film 6 inside the cartridge 3 becomes gradually tighter. This is due to the fact that the ratio of the gear of the driving mechanism 2 to that of the driving mechanism 4 is set in such a manner that the feeding speed of the film 6 is slower than the peripheral speed of the wind-up spool 5.

When photo-taking and one-frame feeding is repeated following the above operation, the film 6 inside the cartridge 3 is completely tightly wound around the spool 3a. Thereafter, the cartridge spool 3a is not driven via the driving mechanism 2, but instead it is driven by the action of the film 6 being pulled out from the cartridge 3. The rotational speed of the cartridge spool 3a is faster than the speed at which it is driven via the driving mechanism 2, thus causing the rotational speed of each gear of the driving mechanism 2 to increase via a fork 7. As a result, a one-way clutch 8 inside the driving mechanism 2 is disconnected, thereby causing the difference between the rotation caused by the motor 1 and the rotation caused by the action of the film 6 being pulled out to be absorbed.

If a distinction is made between the time until a film is tightly wound around a cartridge spool when the film is being wound by such a winding/rewinding apparatus, which time is called "first-half winding period" and the time after it is tightly wound, which time is called "second-half winding period", the point in time at which these first and second half winding periods are switched changes due to the dimension of a cartridge, a gear ratio or the like. For example, in a 36-frame cartridge, such point in time is near the tenth or the 15th frame.

As described above, in the first-half winding period, the film 6 is pulled out of the cartridge 3 by the wind-up spool 5. Since the cartridge spool 3a driven by the motor 1 only attemps to loosely wind up the film 6 inside the cartridge 3, the load of the motor 1 for driving the cartridge spool 3a via the driving mechanism 2 is small.

On the other hand, in the second-half winding period, since the section from the one-way clutch 8 to the cartridge spool 3a is disconnected by the one-way clutch 8, the load for the driving mechanism 2 of the motor 1 becomes smaller. However, at this time, the section from the cartridge spool 3a to the one-way clutch 8 is driven by the film 6 tightly wound onto the cartridge spool 3a. This becomes a load for the motor 1 via the wind-up spool 5 and the driving mechanism 4.

As described above, when the load of the motor 1 during the first- and second-half winding periods is considered in its entirety, the load of the motor 1 during the second-half winding period is greater than that during the first-half winding period. An increase in the load of the motor in the middle of this winding causes its rotational speed to decrease. As a result, the film feeding speed decreases.

Particularly, when a power cell whose service life is near the end is used, even if it operates normally during the initial winding period because the load is light, the winding speed will decrease abnormally in the latter half period of the winding and there is a danger that the continuation of photo-taking will be impaired.

Therefore, if a film is wound by a conventional winding/rewinding apparatus, the operability and reliability of a camera is decreased. Further, when various photo-taking information is recorded on the film during winding, the information recording density varies due to an unstable winding speed. This presents the problem that the reliability of recorded information is diminished.

Although, in the above description, a case of a push-out cartridge/normal winding method is described, the present invention is not limited to such a case. The same can be said of general 135-type cartridges and a preliminary winding method.

SUMMARY OF THE INVENTION

An object of the present invention is to provide a method which is capable of winding up a film in a camera at a stable feeding speed until the film is completely wound and which does not apply an excessive load to the motor.

The present invention will now be explained in correspondence with FIGS. 1 and 2 in which an embodiment is shown. The present invention is applied to a method of winding films of a camera, in which the cartridge spool 3a is rotated in the feeding direction so as to feed the film 6 from the cartridge 3 and the film 6 is wound up by the wind-up spool 5 of a camera each time a photo is taken. The above-described objects can be achieved by causing the cartridge spool 3a to rotate in the feeding direction so as to prevent the film from being tightly wound around the cartridge spool 3a by the winding-up during the time when all film frames have been completely photographed.

In the above explanation of the construction of the present invention, to make the present invention be easily understood, reference characters of this embodiment are used. However, it is to be understood that this invention is not limited to the embodiment described above.

The foregoing and other objects, features and advantages of the present invention will become clear when reference is made to the following description of the preferred embodiments of the present invention, together with reference to the accompanying drawings.

DESCRIPTION OF THE PREFERRED EMBODIMENTS

Figure 1:
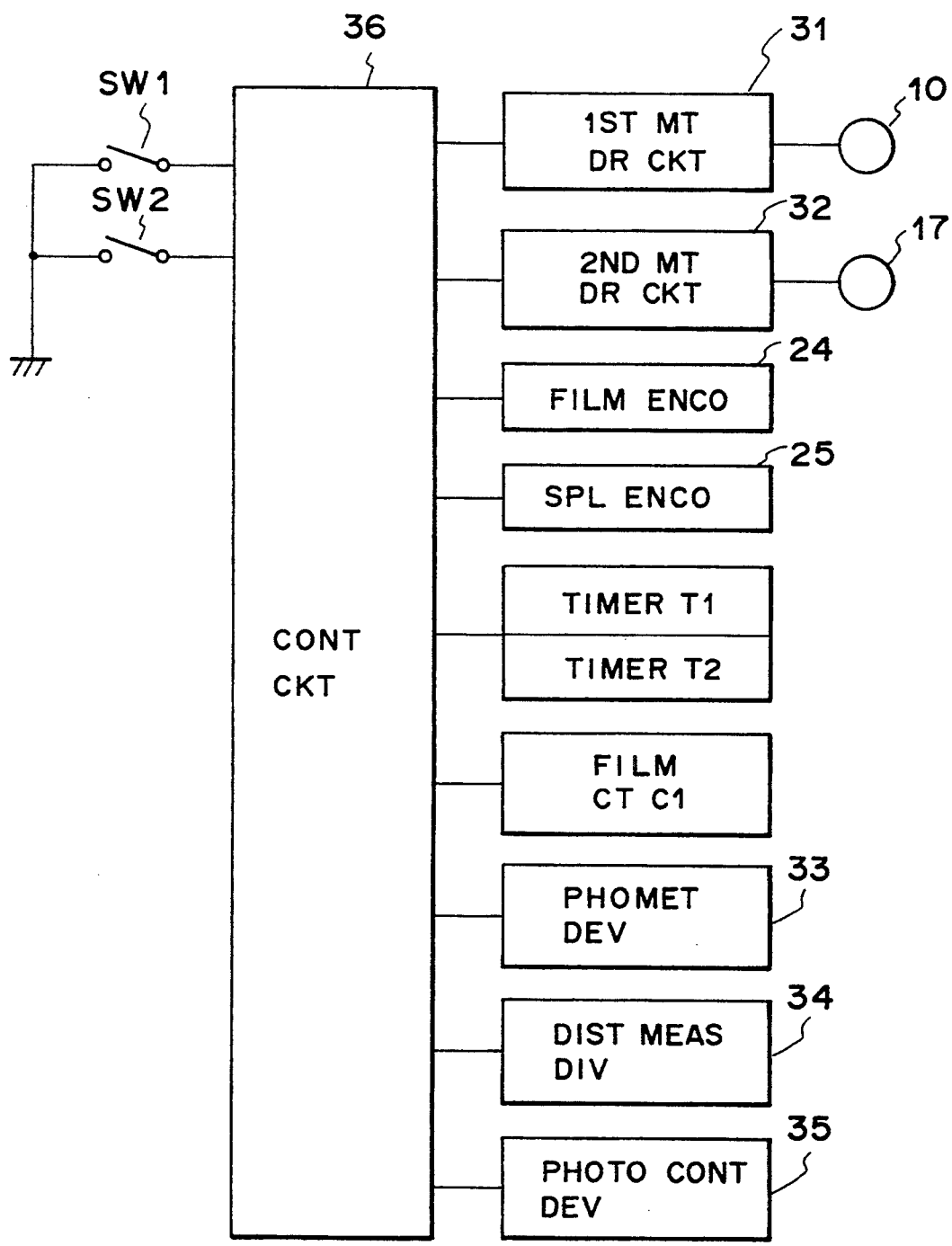
FIG. 1 is a block diagram showing an embodiment of the present invention.
Figure 2:
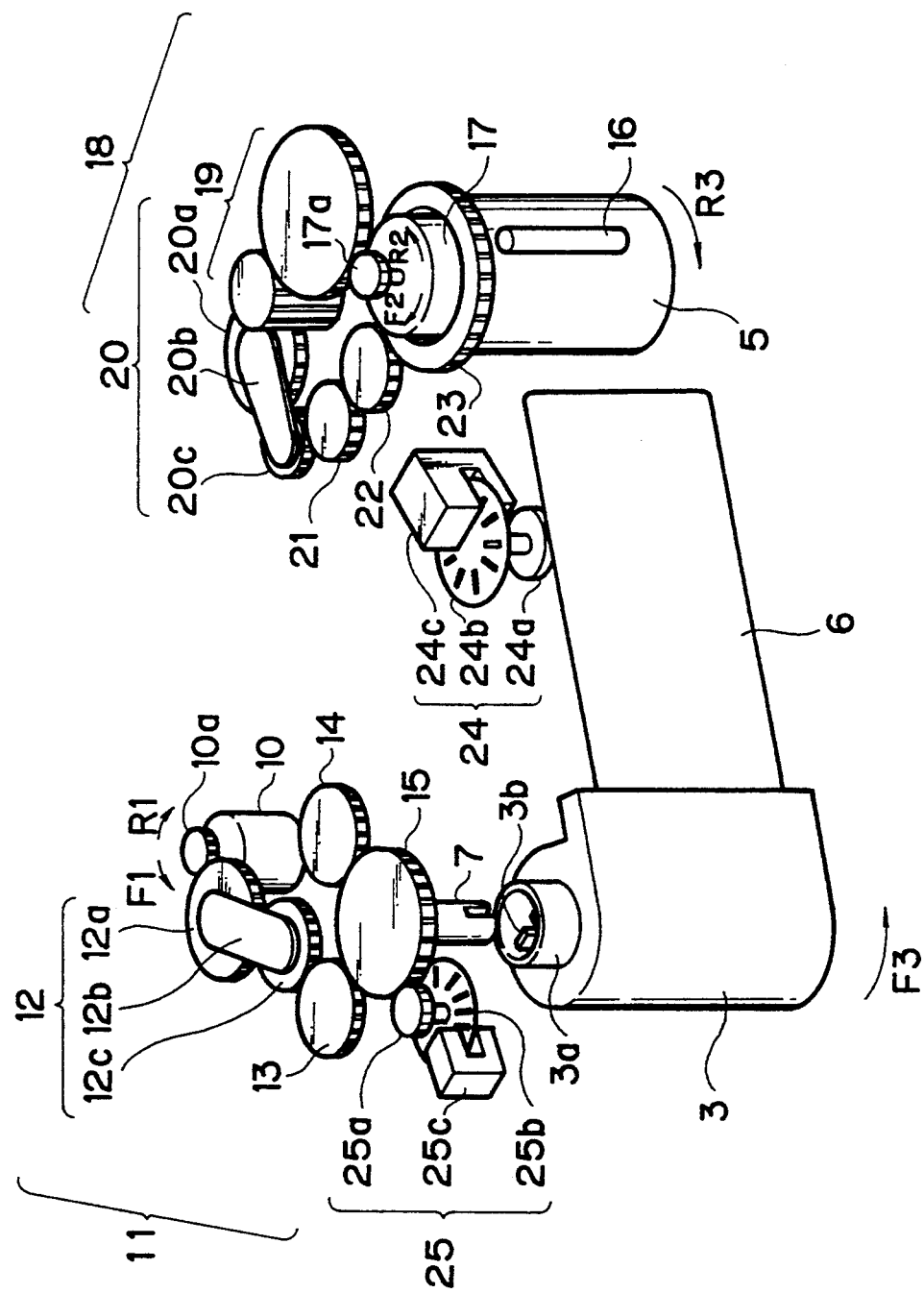
FIG. 2 is a perspective view showing the winding-/rewinding mechanism section of a camera according to the present invention.

FIG. 1 is a block diagram showing the entire construction of an embodiment of the present invention. FIG. 2 is a perspective view showing the winding-/rewinding mechanism section of a camera according to the present invention.

Figure 9:
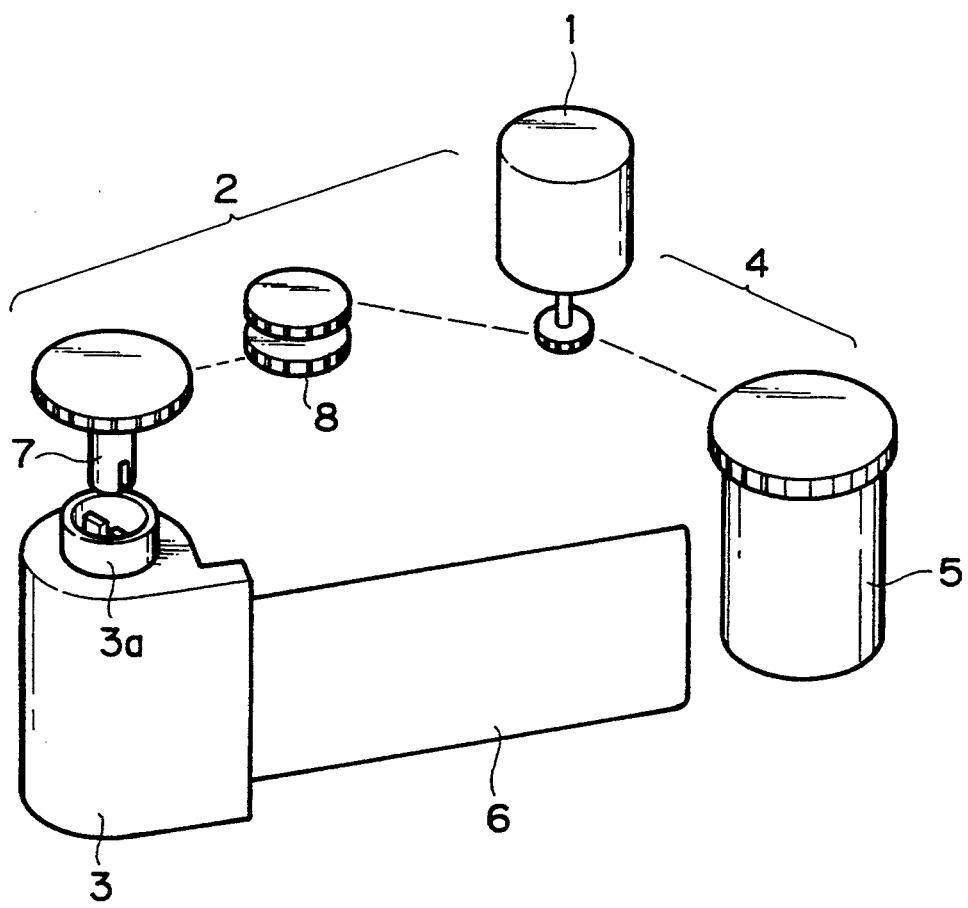
FIG. 9 is a perspective view showing a winding-/rewinding mechanism section of a conventional camera.

First, referring to FIG. 2, a winding/rewinding mechanism section of the camera according to the present invention will be explained. Parts in FIG. 2 corresponding to those parts in FIG. 9, which shows the prior art, are given the same reference numerals, and an explanation thereof is omitted.

Reference numeral 10 denotes a first motor for driving a cartridge spool 3a via a first driving mechanism 11. The first driving mechanism 11 comprises a gear 10a fixedly mounted on a rotation shaft of the first motor 10, a planetary mechanism 12 consisting of a gear 12a, a planetary arm 12b and a planetary gear 12c, a gear 13 which engages the planetary gear 12c during the feeding of the film, a gear 14 which engages the planetary gear 12c during the rewinding of the film, a gear 15 for driving a cartridge spool, and a fork 7 fixedly mounted on this gear 15.

Reference numeral 17 denotes a second motor for driving a wind-up spool 5 via a second driving mechanism 18. This second driving mechanism 18 comprises a gear 17a fixedly mounted on a rotation shaft of the second motor 17, a gear train 19, a second planetary mechanism 20 consisting of a gear 20a, planetary arm 20b and a planetary gear 20c, gears 21 and 22, and a spool gear 23 which rotates together with the wind-up spool 5.

Reference numeral 16 denotes a film pressing roller which is energized by an unillustrated spring and pressed against the wind-up spool 5. When a front end of the film 6 reaches the wind-up spool 5, the end is pressed against the wind-up spool 5 by the film pressing roller 16, and the film 6 is wound around the wind-up spool 5 due to the rotation of the wind-up spool 5.

Reference numeral 24 denotes a photoelectric film encoder for detecting how much the film 6 has been fed. When the film 6 passes a detection roller 24a, the roller 24a rotates, thereby causing a slit plate 24b mounted on the detection roller 24a to rotate. The slit plate 24b intermittently shuts out the light rays of a photoelectric converter 24c in which a light projector and a light receiver are integrally formed, in proportion to the rotational speed of the slit plate 24b. The photoelectric converter 24c converts light pulse signals generated due to the rotation of the slit plate 24b into electrical pulse signals and outputs them.

Reference numeral 25 denotes a photoelectric spool encoder which detects the rotational angle of a cartridge spool 3a via the fork 7 and the gear 15. When the cartridge spool 3a rotates in the same manner as the roller 24a in the film encoder 24, the gear 25a rotates via the fork 7 and the gear 15, and a slit plate 25b mounted on this gear 25a also rotates. The slit plate 25b intermittently shuts out the light rays of the photoelectric converter 25c in response to the rotation and in proportion to the rotational speed of the slit plate 25b. The photoelectric converter 25c converts light pulse signals generated due to the rotation of the slit plate 25b into electrical pulse signals and outputs them.

Next, the operation of the winding/rewinding mechanism section shown in FIG. 2 will be explained.

When the film cartridge 3 is loaded into a camera, a spline 3b of the cartridge spool 3a is fitted into a recess of the fork 7. If the first motor 10 is rotated in a direction F1, i.e., in the direction of the feeding of the film 6, the planetary arm 12b swings in a clockwise direction in response to the gear 12a being driven in a clockwise direction, and the planetary gear 12c engages the gear 13. As a result, the rotational force of the first motor 10 is transmitted in the following order: gear 10a→gear 12a→planetary gear 12c→gear 13→gear 15. The cartridge spool 3a is then driven in a counterclockwise direction, and the film 6 is thrust out of the film cartridge 3.

When it is detected by the encoder 24 that the front end of the film 6 has passed the film encoder 24, the second motor 17 begins to rotate in the direction F2, i.e., in the film winding direction. The rotation of the second motor 17 is transmitted to the gear 20a via the gear 17a and the gear train 19. The gear 20a rotates in a counterclockwise direction, causing the planetary arm 20b also to swing in a counterclockwise direction. The planetary gear 20c engages the gear 21. That is, the rotation of the second motor 17 is transmitted in the following order: gear 17a→gear train 19→gear 20a→planetary gear 20c→gear 21→gear 22→spool gear 23. The wind-up spool 5 fixedly mounted on the spool gear 23 rotates in the film wind-up direction. The front end of the film 6 is pressed against the wind-up spool 5 by the film pressing roller 16 with the result that the film 6 is wound around the wind-up spool 5. At this time, to make the film 6 reliably be wound around the wind-up spool 5, control is effected so that the feeding speed VF of the film 6 is slightly slower than the peripheral speed VS of the wind-up spool 5 by a control circuit to be described later.

Next, during rewinding of the film, when the first motor 10 is rotated in the direction R1, i.e., in the rewinding direction, in response to the gear 12a being driven in a counterclockwise direction, the arc 12b is also driven in a counterclockwise direction and the planetary gear 12c engages the gear 14. As a result, the rotation of the first motor 10 is transmitted in the following order: gear 10a→gear 12a→planetary gear 12c→gear 14→gear 15. The cartridge spool 3a is driven in a clockwise direction, and the film 6 is rewound in the film cartridge 3.

Prior to the rewinding of the film, the second motor 17 is started and driven for a given time in the direction R2 by a control circuit to be described later in order to cause the planetary arm 20b to swing in a clockwise direction, releasing the engagement of the planetary gear 20c with the gear 21. As a result, during film rewinding, the second motor 17 can be prevented from rotating by means of the first motor 10.

Next, referring to FIG. 1, the entire construction of a winding/rewinding apparatus of a camera according to the present invention will be explained. Parts in FIG. 1 which are identical to those parts in FIG. 2 are given the same reference numerals, and an explanation thereof is omitted.

Reference numeral 31 denotes a driving circuit for driving the first motor 10; reference numeral 32 denotes a driving circuit for driving the second motor 17; reference letters T1 and T2 each denote a timer; reference letter C1 denotes a film counter for counting the number of wound frames of film; reference numeral 33 denotes a photometering apparatus for photometering the inside of the image plane and outputting brightness information; reference numeral 34 denotes a range finding apparatus which detects the focus-point adjusted state of an unillustrated photo-taking optical system and outputs focus-point detection information; reference numeral 35 denotes a photo-taking control apparatus which controls the shutter mechanism section and an aperture mechanism section.

Reference letter SW1 denotes a switch which is turned on when a shutter release is half-pushed; and reference letter SW2 denotes a switch which is turned on when the shutter release is fully pushed.

Reference numeral 36 denotes a control circuit comprising a microcomputer and peripheral units thereof, which controls the winding/rewinding of the film 6 by executing a film winding/rewinding control program to be described later.

Next, a film winding method by a winding/rewinding apparatus of this embodiment will be explained.

In this embodiment, when one-frame feeding is performed after each photo-taking frame is photographed, the second motor 17 is driven to wind up the film 6 onto the wind-up spool 5 and the first motor 10 is driven to cause the cartridge spool 3a to rotate a predetermined amount in the direction F3 so that a state in which the film 6 is loosely wound inside the cartridge 3 relative to the cartridge spool 3a is maintained at all times.

Figure 3:
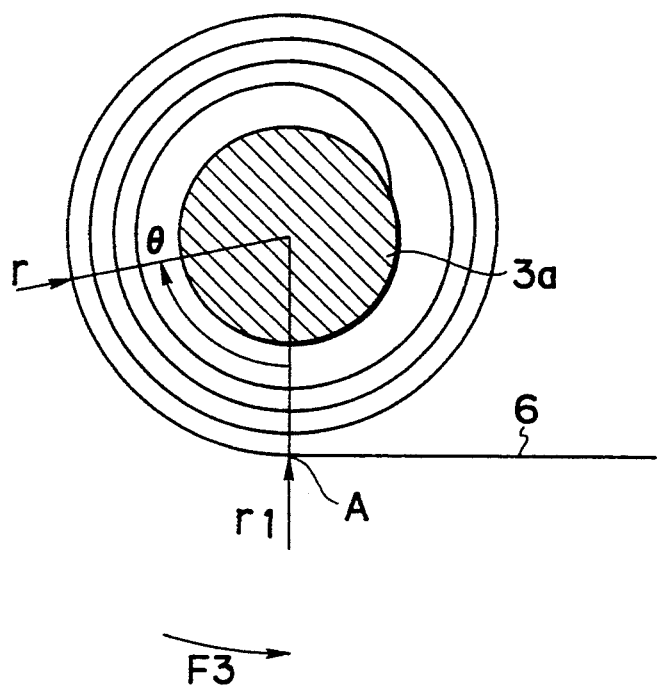
FIG. 3 is a view showing a state of a film inside a cartridge when a first frame of the film is set at a predetermined photo-taking position.

FIG. 3 shows the state of the film 6 inside the cartridge 3 at the time when the initial winding is terminated, namely, when the loaded film 6 is fed from the cartridge 3 and wound around the wind-up spool 5, and the first frame is positioned at a predetermined photo-taking position. In FIG. 3, the film 6 is shown as seen in the direction of the width without regard to the thickness of the film 6.

In this embodiment, the first and second motors 10 and 17 are controlled during the initial winding of the film 6 as described below.

After the cartridge 3 is loaded, the first motor 10 is started in the film feeding direction so as to cause the film 6 to be fed. When the front end thereof reaches the wind-up spool 5, the first motor 10 is stopped. Next, the second motor 17 is started to cause the film 6 to be pulled out of the cartridge 3. When the first frame reaches a predetermined photo-taking position, the second motor 17 is stopped. Therefore, the film 6 inside the cartridge 3 is completely loosely wound when the driving of the first motor 10 is terminated. Thereafter, since the first motor 10 is not driven when the second motor 17 is driven, the film 6 is slightly more tightly wound around the cartridge spool 3a when the driving of the second motor 17 is terminated, namely, the outermost circumference of the film 6 inside the cartridge 3 is slightly smaller.

The cartridge spool 3a is rotated in the film feeding direction each time one frame is fed after photo-taking is performed so that the gap between the cartridge spool 3a when this initial winding is terminated and the innermost diameter section of the film 6 will not change until all photo-taking frames have been completely photographed. That is, the rotational angle of the fork 7 is controlled.

In FIG. 3, assuming that the film 6 is spirally orderly wound, a radius r to the center of the thickness of the outermost film layer at the position of an angle $\theta$ (radian) from the point A at which the film 6 is fed, is given by the following equation:

$$r = r1 - (\theta/2\pi) \cdot t \qquad (1)$$

$$L = r1 \cdot \theta - (t/4\pi)\theta^2 \qquad (2)$$

where r1: radius to the center of the thickness of the outermost film layer at point A
L: length of the outermost film layer in section $\theta$ from point A
t: thickness of film
$\pi$: ratio of the circumference of a circle to its diameter Solving the above equation (2) with respect to $\theta$ under the condition of $\theta \geq 0$ yields the following:

$$\theta = (2\pi/t) \cdot (r1 - \sqrt{r1^2 - (tL/\pi)}) \qquad (3)$$

As can be seen from FIG. 3, if the cartridge spool 3a is rotated as much as θ in a direction F3 at the same time the film 6 is pulled out as far as L during the one-frame feeding, the size of the gap between the cartridge spool 3a and the innermost diameter of the film 6 does not change. For example, when the first frame is exposed after the initial winding, the second frame is aligned at a predetermined phototaking position after one-frame feeding, and an angle θ is determined from equation (3) assuming L=image plane pitch P. It is necessary that the first motor 10 be driven by this θ so as to cause the fork 7, i.e., the cartridge spool 3a to rotate. Similarly, during the one-frame feeding of the n-th frame after exposure, an angle θn for which the fork 7 should be rotated can be determined from the equation shown below by using equation (3):

$$\theta n = \theta(L=P.n) - \theta(L=P.(n-1)) \quad (4)$$

where $\theta(L=P.n)$ indicates θ with equation (3) being as $L=P.n$, and $\theta(L=P.(n-1))$ indicates θ with equation (3) being as $L=P.(n-1)$.

Figure 4:
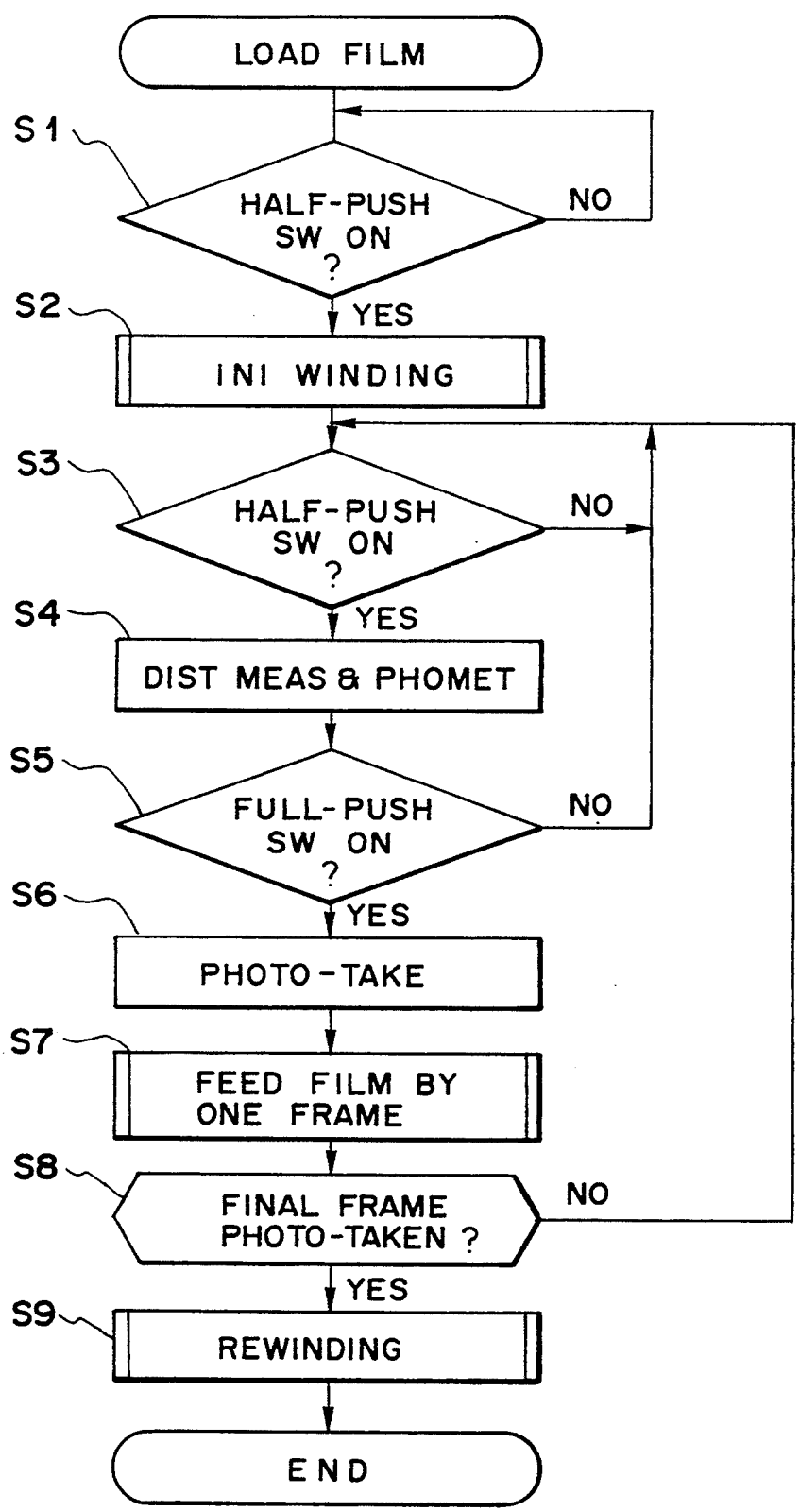
FIG. 4 is a flowchart showing an example of a program for controlling the winding/rewinding of a film.

FIG. 4 is a flowchart showing an example of a program for controlling the winding/rewinding of a film. The winding/rewinding operation will now be explained with reference to this flowchart.

The control circuit 36 begins to execute this program when the film cartridge 3 is loaded and the back lid of the camera is closed. In step S1, a check is made by a switch SW1 whether a shutter release is half pushed. The step is repeated until the shutter release is half pushed. If it is half pushed, the process proceeds to step S2 where an initial winding subroutine shown in FIG. 5 is performed.

Figure 5:
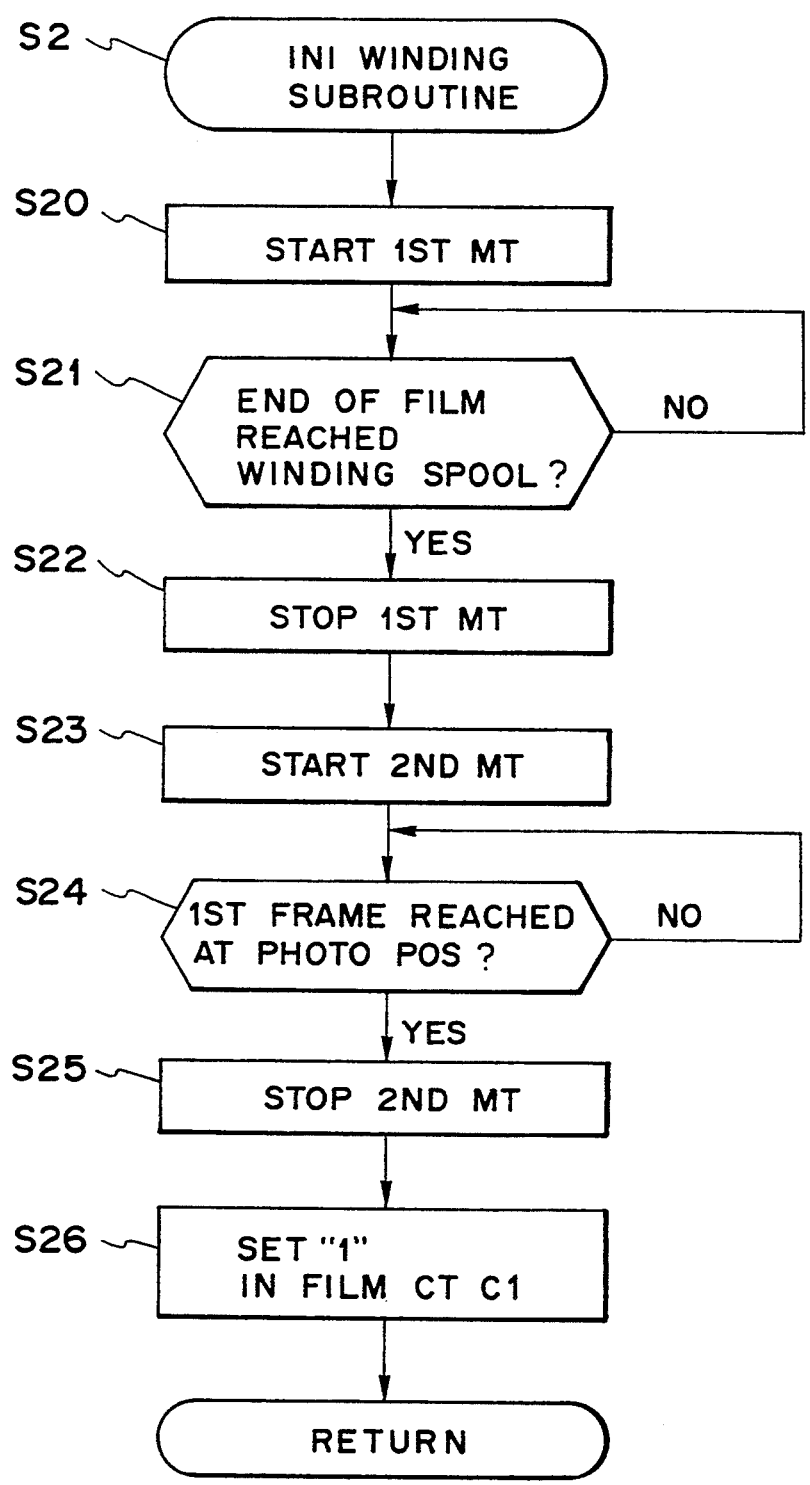
FIG. 5 is a flowchart showing an initial winding subroutine thereof.

In step S20 of FIG. 5, the first motor 10 is started in the film feeding direction F1 so as to start the feeding of the film 6. In a subsequent step S21, a check is made by film encoder 24 whether the film is fed until the front end of the film 6 reaches the wind-up spool 5. The step is repeated until it reaches the wind-up spool 5. When the front end of the film 6 reaches the wind-up spool 5, the process proceeds to step S22 where the first motor 10 is stopped.

Next, in step S23, the second motor 17 is started in a winding direction F2 so as to start to wind the film 6. In step S24, a check is made by the film encoder 24 whether the first frame of the film 6 has reached a predetermined phototaking position. The step is repeated until the frame reaches the predetermined phototaking position. When the first frame reaches the phototaking position, the process proceeds to step S25 where the second motor 17 is stopped. Then, a film counter C1 is set at 1 in step S26 and the process returns to the main program.

When the initial winding is terminated, the process proceeds to step S3 in FIG. 4, where a check is made by the switch SW1 whether the shutter release is half pushed. The step is repeated until the shutter release is half pushed. When it is half pushed, the process proceeds to step S4 where range finding and photometering operations are performed by range finding apparatus 34 and photometering apparatus 33 respectively. Next, in step S5, a check is made by switch SW2 whether the shutter release has been fully pushed. Steps S1 to S5 are repeated until it is fully pushed. When the shutter release has been fully pushed, the process proceeds to step S6 where a phototaking operation is performed by phototaking control apparatus 35.

Figure 6A:
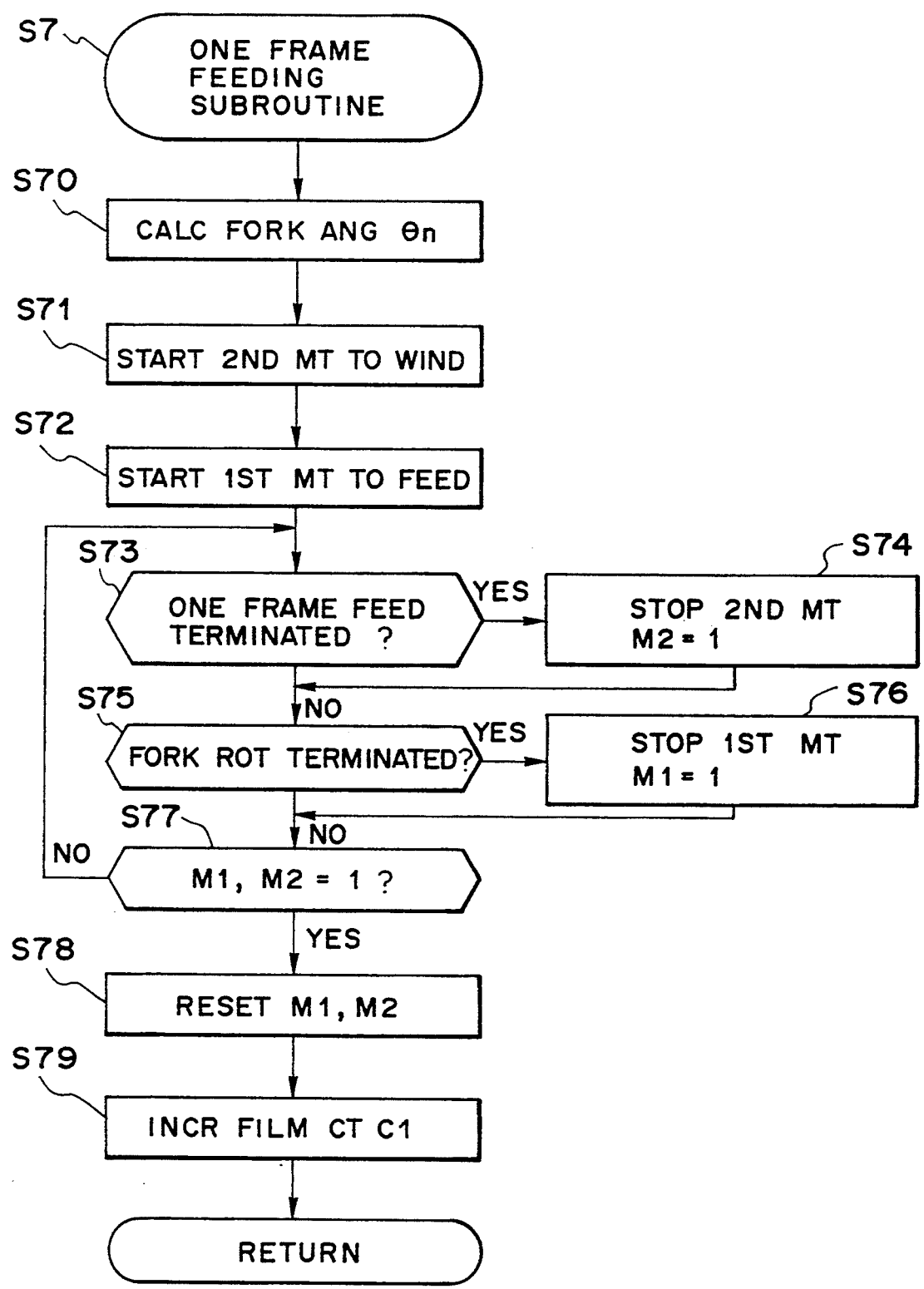
FIG. 6A is a flowchart showing a one-frame feeding subroutine thereof.

In step S7 subsequent to the step in which the first frame has been photo-taken, a one-frame feeding subroutine shown in FIG. 6A is performed.

In step S70 in FIG. 6A, a required rotational angle θn of the fork 7 is calculated by substituting the number N of frames of the film counter C1 for the above-described equation (4). In step S71, the second motor 17 is started in a winding direction F2, and further, in step S72, the first motor 10 is started in the feeding direction F1. In a subsequent step S73, a check is made by the film encoder 24 whether one frame film feeding has been terminated. If it has been terminated, the process proceeds to step S74 where the second motor 17 is stopped and a flag M2 is set.

Next, in step S75, a check is made by spool encoder 25 whether the fork 7 has rotated the required rotational angle θn which was calculated in the above step. If it has rotated, the process proceeds to step S76 where the first motor 10 is stopped and the flag M1 is set. In a subsequent step S77, a check is made whether both flags M1 and M2 have been set, namely, whether the one-frame film feeding and the rotation of the fork 7 have been completed. If either of them has not been completed, the process returns to step S73. If both of them have been completed, the process proceeds to step S78. In step S78, flags M1 and M2 are reset, and further, in step S79, the film counter C1 is incremented and the process returns to the main program.

On the termination of the one-frame feeding, in step S8 in FIG. 4, a check is made whether the phototaking of the last frame has been terminated. If it has not terminated, the process returns to step S3 where the above-described process is performed for the next frame. When the phototaking of the last frame has been terminated, the process proceeds to step S9 where the rewinding subroutine shown in FIG. 7 is performed.

Figure 7:
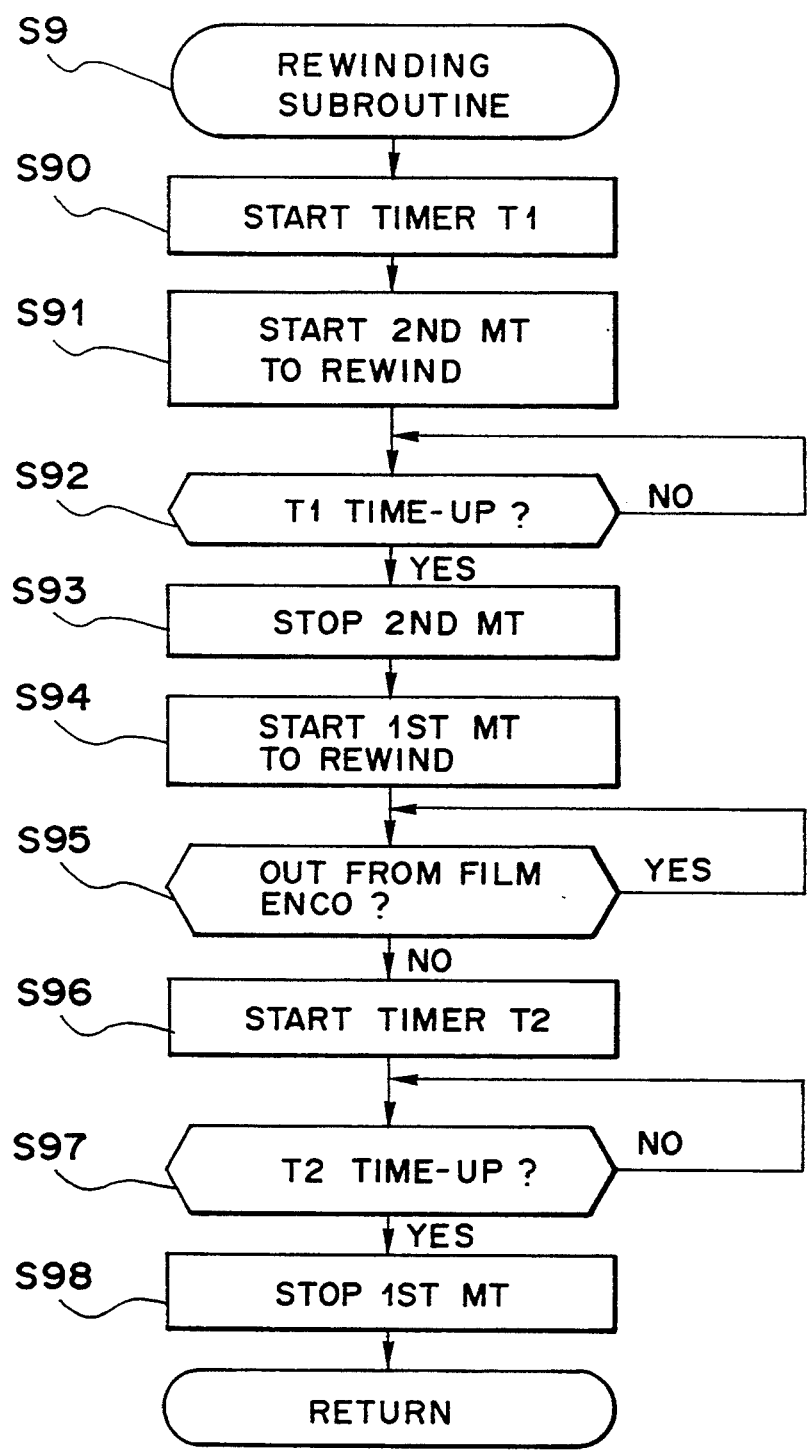
FIG. 7 is a flowchart showing a rewinding subroutine.

In step S90 in FIG. 7, a timer T1 is started, and in a subsequent step S91, the second motor 17 is started in a rewinding direction R2. As described above, this is for the purpose of releasing the engagement of the planetary gear 20c with the gear 21 so that the second motor 17 does not become a load for the first motor 10 during film rewinding. Hence, a time period in which the engagement of the planetary gear 20c with the gear 21 can be reliably released is set in the timer T1. In step S92, the driving of the second motor 17 is continued until the time period for which the timer T1 is set expires. After time-up, the process proceeds to step S93 where the second motor 17 is stopped.

Next, in step S94, the first motor 10 is started in the rewinding direction R1 so as to rewind the film 6. In step S95, a check is made whether there are pulse signals from the film encoder 24. The step is repeated until there are no pulse signals. If there are no pulse signals, the process proceeds to step S96 where the timer T2 is started. That is, if the front end of the film 6 has passed the film encoder 24 and there are no output signals, the timer T2 is started. In step S97, the driving of the rewinding of the first motor 10 is continued a predetermined time period T2 until the time period for which the timer T2 is set expires. The film 6 is rewound completely into the cartridge 3. When the time-period timer T2 is up in step S97, the process proceeds to step S98 where the first motor 10 is stopped and the process returns to the main program.

When the above outputs are completed, the execution of the program is terminated.

As has been explained above, the fork rotational angle θn is calculated each time one-frame feeding after each phototaking frame is exposed is performed in order that the size of the gap between the innermost diameter of the film 6 and the cartridge spool 3a when the first frame of the film 6 is set at a predetermined phototaking position is not changed. The first motor 10 is driven in the film feeding direction so that the fork rotates by that rotational angle θn. Therefore, there will be no such cases where the film 6 will be tightly wound around the cartridge spool 3a due to the winding of the film by the time the phototaking of all frames is completed. As a result, the load of the second motor 17 becomes almost fixed by the time the phototaking of all frames is completed. The film winding speed is stable, and the operability and reliability of a camera is enhanced.

In the above-described embodiment, since the fork 7 is rotated at the same time as when the film 6 is wound by the wind-up spool 5 during one-frame feeding, the time for feeding one frame is not lengthened, thus making it possible to wind a film efficiently.

In addition, in a camera which magnetically and optically records and reproduces various phototaking information in a film during one-frame feeding since the film feeding speed during winding is stabilized according to the above-described winding method, reliability during information recording and reproduction is improved.

Although, in the above-described embodiment, the fork 7 is rotated while one-frame feeding of a film is being performed, the fork 7 may be rotated before or after one-frame feeding.

Figure 6B:
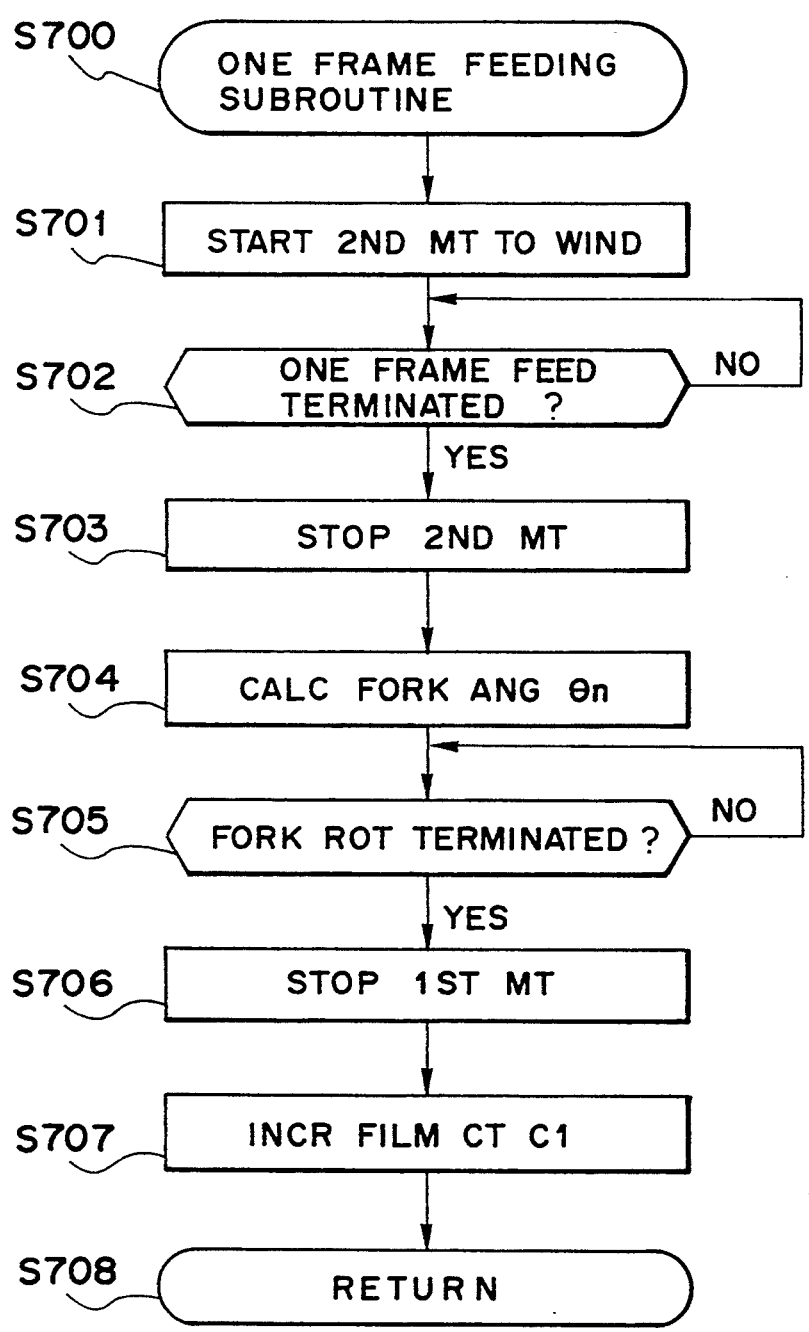
FIG. 6B is a flowchart showing a modification of the one-frame feeding subroutine.

FIG. 6B shows a case in which a routine of FIG. 6A is modified in such a way that the fork 7 is rotated after one-frame feeding. The routine may also be modified in such a way that the fork 7 is rotated before one-frame feeding. In this case, when the film is closely contacted and expansively wound outwardly, the cartridge spool 7 cannot be rotated more than that amount. Therefore, the cartridge spool should be rotated each time each frame is fed after a film is placed in a loosely wound state inside a cartridge with the cartridge spool 7 not being rotated, for example, for feeding of initial several frames.

In the above-described embodiment, the fork 7 is rotated the rotational angle θn calculated by equation (4) during one-frame feeding of a film. The present invention is not limited to such a method. Any method may be used if it is a method in which a state where the film 6 is loosely wound relative to the cartridge spool 3a can be maintained until the phototaking of all frames is terminated. For example, the fork 7 may be rotated en bloc each time several frames are fed with the fork 7 not being rotated each time one frame is fed. A case in which the fork 7 is rotated every fourth frame is taken as an example. A check is made whether the value of the film counter C1 is a multiple of 4 each time a frame is fed. When it is, the amount of the rotation of the fork 7 corresponding to four frames immediately preceding is calculated in a manner similar to that described above and the fork 7 is rotated en bloc. It may be so arranged that the fork 7 is rotated en bloc at least once by the time the phototaking of all frames is terminated so that the film will not be tightly wound.

Although, in the above-described embodiment, an example of a push-out type cartridge is described, the present invention is not limited to such example. In the case of general 135-type cartridges also, similarly to that described above, it is only necessary that the film not be tightly wound around the cartridge spool by making the cartridge spool rotate in accordance with the winding.

The above-described embodiment is concerned with a case in which a winding operation is frame feeding and the film is fed intermittently. That is, it is a case of ordinary winding in an ordinary winding system camera (the film is successively exposed while the film is being pulled out of the cartridge). In addition to this, the film may be fed continuously to its end during a winding operation. The following cases may be considered:
(a) preliminary winding in a preliminary winding camera (the film is successively exposed while the film is being fed into the cartridge)
(b) information retrieval (for both a preliminary winding camera and ordinary winding camera)

When a camera which records information (for example, magnetic recording) on a film in such a way that exposure information (whether the frame has been exposed, exposure data during exposure, etc.) for each frame is considered, the camera must check the exposure information for each frame in order to check which frame should be exposed first when an exposure is made in the middle and the cartridge is taken out of the camera once and reloaded. In the preliminary winding camera, this must be performed during preliminary winding. In the ordinary winding camera, the film should be continuously pulled out prior to exposure and this retrieval is performed.

As another embodiment, an example in which loose winding around the cartridge spool is secured when a film is continuously wound is shown below. Since a main subject here concerns how much the cartridge spool is rotated in synchronization with the film being wound continuously, a basic routine for preliminary winding and a basic routine of continuous winding in the ordinary winding are not described in detail.

Figure 8:
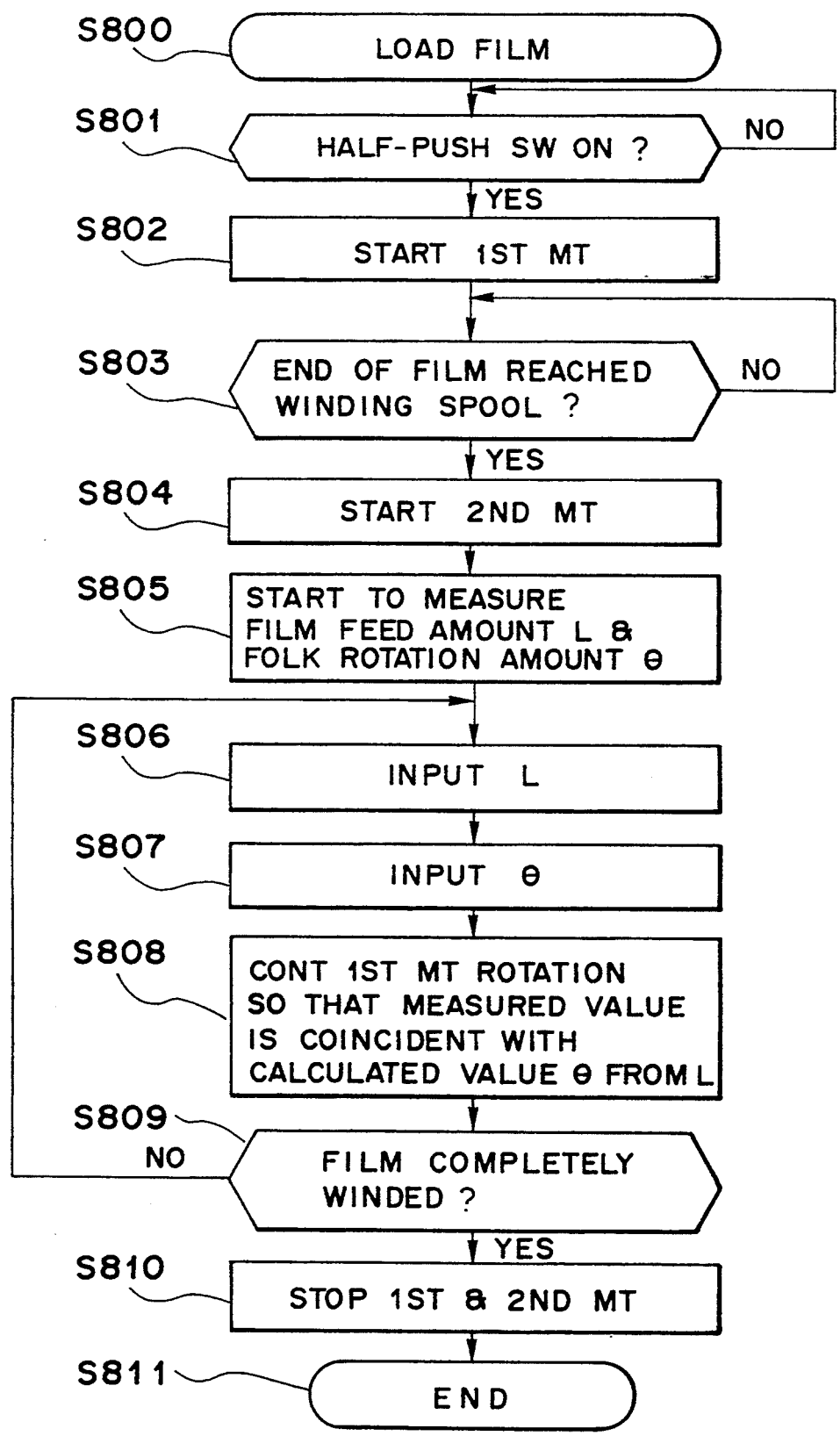
FIG. 8 is a flowchart showing a case in which a fork is continuously rotated during a continuous winding-up of the film.

FIG. 8 shows a routine for a case in which a fork is continuously rotated so that the film is not tightly wound around the cartridge spool when the entire film is continuously wound. Equation (3) shows that a fork should be rotated to a rotation position θ from the initial state when the amount of the film pulled-out is L. Therefore, L is measured in succession during continuous winding.

The rotation of the first motor is controlled so that the angular position of the fork becomes θ corresponding to this.

Although, in addition to that described above, a method can be considered in which a fork is rotated intermittently a corresponding angle each time a given length of continuously wound film is measured, this is not described in detail because it is a method of control similar to the embodiment described earlier (i.e., in the above-described embodiment, this given length is an image plane pitch).

Although, in the above-described embodiment, a cartridge spool and a wind-up spool are each driven by a different motor, the present invention can be applied to a case in which both spools are driven by a single motor. That is, a speed changing mechanism and an electromagnetic clutch are disposed in the driving mechanism of a cartridge spool. Usually, the cartridge spool is driven at a gear ratio of the side at which the film feeding speed is slower than the peripheral speed of a wind-up spool, in the same manner as described above. After initial winding, a switching may be made to a gear ratio at which the feeding speed is increased by an electromagnetic clutch each time a single frame or several frames are fed and the cartridge spool is driven so that the film is not tightly wound around the cartridge spool. Or, a speed changing mechanism and an electromagnetic clutch are not disposed in the cartridge spool driving mechanism, but a clutch is disposed in a wind-up spool driving mechanism. The wind-up spool is disconnected by a clutch before or after each time one frame or several frames are fed, and only the cartridge spool may be driven in the feeding direction.

As has been explained above, since the cartridge spool is rotated in the film feeding direction so that a film will not be tightly wound around the cartridge spool by winding, the wind-up spool at all times winds up the film in a loosely wound state inside the cartridge. A load of a motor for driving the wind-up spool will not increase abruptly in the middle of the winding, and the film can be wound at a stable, constant speed.

As a consequence, operability and reliability during film winding are enhanced. The reliability of recording and reproducing information is improved in a case where various photo-taking information is recorded on a film during film winding and information on a film is reproduced.

Many different embodiments of the present invention may be constructed without departing from the spirit and scope of the present invention. It should be understood that the present invention is not limited to the specific embodiments described in this specification, and is only limited in the appended claims.

What is claimed is:

1. A film winding apparatus of a camera for winding a film housed in a cartridge having a cartridge spool, said apparatus having a wind-up spool which winds the film wound around the cartridge spool, comprising:
   first driving means for rotatably driving the cartridge spool in a direction to feed the film from the cartridge;
   second driving means for rotatably driving the wind-up spool in a direction to wind the film fed from the cartridge; and
   control means which controls the first driving means so as to rotate the cartridge spool in the direction to feed the film by an amount which compensates for a tendency of the film to tighten around the cartridge spool when the wind-up spool winds the film.

2. A film winding apparatus of a camera according to claim 1, wherein the control means predetermines the amount of the rotation of the cartridge spool rotated by the first driving means on the basis of the film image plane pitch.

3. A film winding apparatus of a camera according to claim 1, wherein the control means controls the first driving means so that the cartridge spool rotates at the same time the wind-up spool rotates.

4. A film winding apparatus of a camera according to claim 1, wherein the control means controls the first driving means so that the cartridge spool rotates before or after the wind-up spool rotates.

5. A film winding apparatus of a camera according to claim 1, wherein the control means controls the first driving means so that the cartridge spool rotates in reponse to feeding of a predetermined number of film frames.

6. A film winding apparatus of a camera according to claim 1, wherein the control means controls the first driving means so that the cartridge spool rotates each time a predetermined length of a film is fed.

7. A film winding apparatus of a camera according to claim 1, wherein the control means determines the amount of the rotation of the cartridge spool on the basis of the amount of the fed film.

8. A film winding apparatus of a camera according to claim 1, wherein the control means controls the first driving means so that the cartridge spool continuously rotates an amount corresponding to the amount of the wound film.

9. A camera provided with a wind-up spool which winds a film housed in a cartridge having a cartridge spool, comprising:
   a member which is fitted into said cartridge spool when said cartridge is loaded in said camera;
   a first driving part engaged with said member to transfer a rotational force to said member when the film is fed from the cartridge;
   a second driving part engaged with said member to transfer a rotational force to said member when the film fed from the cartridge is wound;
   a third driving part engaged with said wind-up spool to transfer a rotational force to said wind-up spool when said wind-up spool winds the film; and
   a control part which causes said first driving part to rotate said member by an amount which compensates for a tendency of the film to tighten around said cartridge spool when said wind-up spool winds the film.

10. An apparatus provided with a wind-up spool which winds a film housed in a cartridge having a cartridge spool, comprising:
   a member which is fitted into said cartridge spool when said cartridge is loaded in said apparatus;
   a first driving part engaged with said member to transfer a rotational force to said member when the film is fed from the cartridge;
   a second driving part engaged with said member to transfer a rotational force to said member when the film fed from the cartridge is wound;
   a third driving part engaged with said wind-up spool to transfer a rotational force to said wind-up spool when said wind-up spool winds the film; and
   a control part which causes said first driving part to rotate said member by an amount which compensates for a tendency of the film to tighten around said cartridge spool when said wind-up spool winds the film.

* * * * *